(12) United States Patent
Brenner

(10) Patent No.: US 6,675,530 B2
(45) Date of Patent: Jan. 13, 2004

(54) METHOD OF LARGE SCALE AFFORESTATION

(75) Inventor: Gottfried Brenner, Weilheim (DE)

(73) Assignee: Fordergemeinschaft "Baume fur Menschen Trees of the World" e.V., Weilheim (DE)

( * ) Notice: Subject to any disclaimer, the term of this patent is extended or adjusted under 35 U.S.C. 154(b) by 0 days.

(21) Appl. No.: 10/182,846

(22) PCT Filed: Feb. 2, 2001

(86) PCT No.: PCT/EP01/01125
§ 371 (c)(1),
(2), (4) Date: Aug. 2, 2002

(87) PCT Pub. No.: WO01/56365
PCT Pub. Date: Aug. 9, 2001

(65) Prior Publication Data
US 2003/0009938 A1 Jan. 16, 2003

(30) Foreign Application Priority Data
Feb. 4, 2000 (DE) ......................................... 100 04 976

(51) Int. Cl.⁷ .............................................. G09F 19/00
(52) U.S. Cl. .................................. 47/58.15 C; 144/335
(58) Field of Search ....................... 47/58.112, 58.15 C, 47/58.1 SE; 144/335, 356

(56) References Cited

U.S. PATENT DOCUMENTS

| | | | | |
|---|---|---|---|---|
| 4,986,363 A | | 1/1991 | Nahmiaj | ........................ 169/46 |
| 5,799,488 A | * | 9/1998 | Truong | ..................... 47/1.01 R |
| 2003/0009938 A1 | * | 1/2003 | Brenner | .................. 47/58.1 SC |

FOREIGN PATENT DOCUMENTS

| | | |
|---|---|---|
| CA | 1231464 | 10/1999 |
| DE | 38 76 335 T2 | 5/1993 |
| DE | 42 11 171 A1 | 10/1993 |
| DE | 44 22 411 A1 | 1/1995 |
| DE | 195 14 454 A1 | 10/1996 |
| DE | 299 11 903 U1 | 10/1999 |
| DE | 100 04 976 C1 | 9/2001 |
| FR | 2632251 | 12/1989 |
| FR | 2753338 | 3/1998 |
| JP | 7-246029 | 9/1995 |
| RU | 2069946 C1 * | 12/1996 |
| SU | 1697855 A1 * | 12/1991 |

OTHER PUBLICATIONS

Margarita Öhm, "The Project," Aug. 2000 (and verified English-language translation thereof).
Margarita Öhm, "The Project," published Aug. 16, 2000, at http://www.baeume.de/logowald/projekt/index.html (and English-language translation thereof published at http://www.baeume.de/longowald/projekt/indexe.html).
"Overview of Fire and Smoke Management Issues and Options in Tropical Vegetation", Goldammer, Transboundary Pollution and the Sustainability of Tropical Forests: Towards Wise Forest Fire Management—The Proceedings of the AIFM International Conference, 1997, pp. 189–217.
"The Project", Margarita Öhm, Aug. 2000.
International Search Report in PCT/EP01/01125 dated May 22, 2001.
International Preliminary Examination Report in PCT/EP01/01125 dated Jan. 22, 2002.

* cited by examiner

*Primary Examiner*—Peter M. Poon
*Assistant Examiner*—Jeffrey L. Gellner
(74) *Attorney, Agent, or Firm*—Marshall, Gerstein & Borun LLP

(57) ABSTRACT

In a method of large scale afforestation two types of firebreak (5, 7) are employed. Firebreaks (5) of a first type are placed in a regular grid pattern and with a ground configuration which in terms of color is adapted to the surroundings, whereas firebreaks (7) of a second type are laid out with an irregular development, which furthermore contrast in color and are provided with a different width. Further, fencing in in parcels is expedient.

2 Claims, 1 Drawing Sheet

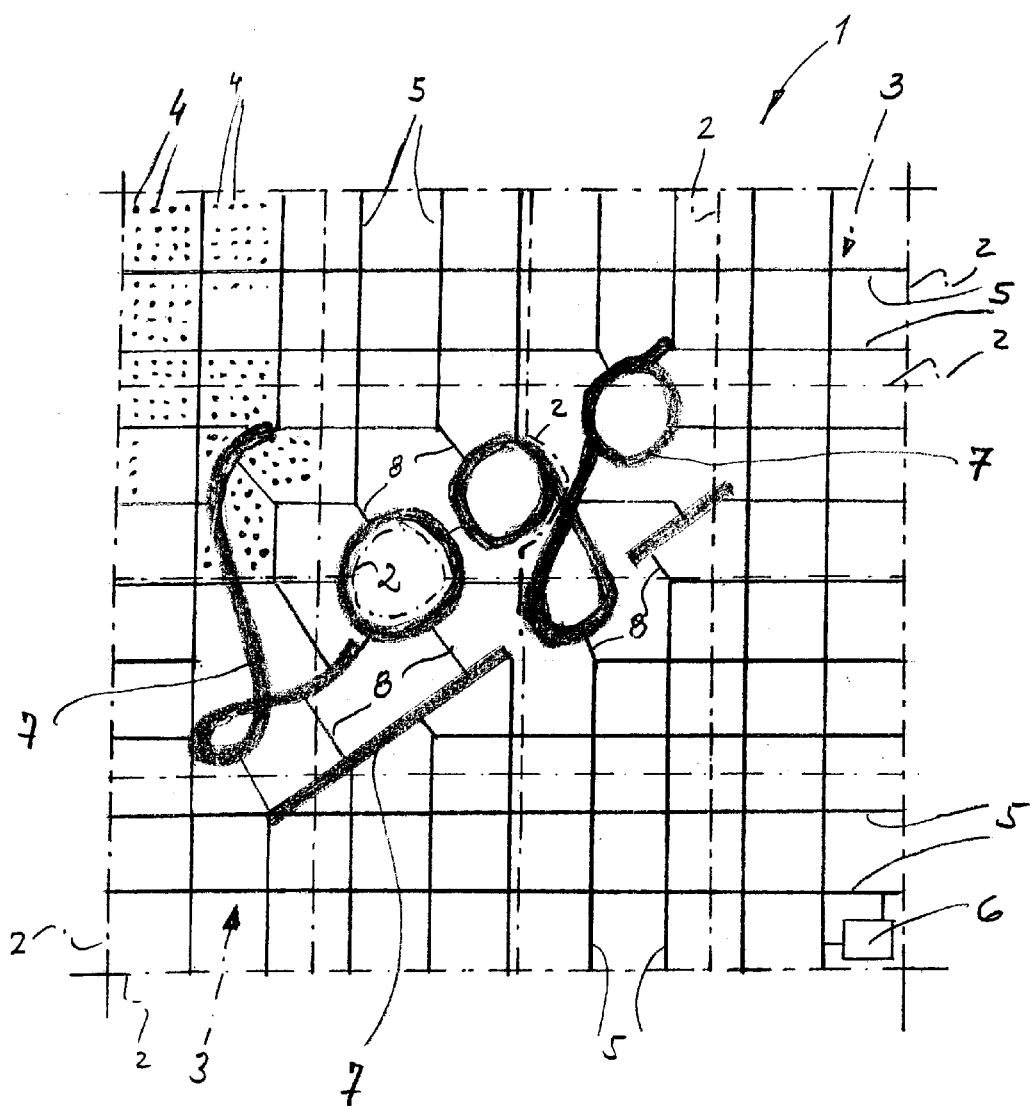

METHOD OF LARGE SCALE AFFORESTATION

BACKGROUND OF THE INVENTION

1. Field of the Invention

The invention relates to a method of large scale afforestation.

2. Brief Description of Related Technology

Conventionally, for afforestation, shoots or saplings are placed in the area be afforested and these are tended until they reach a stage which allows the saplings to be left to themselves. With such regions to be afforested which are of large scale it is further usual to provide firebreaks in order to counter the danger of the spread of fires. Thereby, to provide these firebreaks in a simple grid pattern suggests itself, at least when the structure of the terrain of the region to be afforested permits this. These also require considerable, and thereby costly, care and attention.

In particular in developing countries, underdeveloped regions and in regions which tend towards becoming steppe-like or desert-like, afforestation is associated with considerable costs. The landowner, who is in most cases the public authorities, is not always in a position to make available the means needed for this over an extended period of time.

From this starting point, the object of the present invention is so to modify the known method that the success of the afforestation work can be ensured with a greater probability.

SUMMARY OF THE INVENTION

The object is achieved by means of the measures indicated in claim 1.

It is advantageous to further develop the method by means of the features of claim 2.

BRIEF DESCRIPTION OF THE DRAWING

The sole drawing FIGURE schematically illustrates a region that has been subject to afforestation in accordance with the invention.

DETAILED DESCRIPTION OF THE INVENTION

The invention also starts from the recognition, which is not new in itself, that sponsors can be more easily acquired when their name can be brought into connection with the sponsored project, which is conventionally achieved by putting up or setting of placards or posters.

The manner of proceeding in accordance with the invention makes it possible to place characters and symbols, and thus also names and logos of sponsors, on a large scale in a contrasting manner to the afforested surroundings, over longer periods of time, such that the characters so put in place—that is characters formed by means of the firebreaks of the second type—can be recognized from a greater distance, from a mountain, from an airplane, from a balloon, etc.

Further, it has been found also that a reverse cultivation is possible, in order to arrive at a region afforested in conventional manner, and also that regions already afforested in the conventional manner can be recultivated such that the firebreaks of the second type can be put in place in existing conventionally afforested regions.

The invention will be schematically explained with reference to the exemplary embodiment illustrated in the single FIGURE of the drawings.

The FIGURE shows an approximately quadratic region 1 which is to be afforested, which is fenced in by means of fences 2 and is likewise divided up into a grid of substantially quadratic parcels 3. Shoots or saplings 4, schematically represented by points, are distributed over the entire region to be afforested with regular spacings from one another.

In accordance with a certain grid size, firebreaks 5 of a first type are evenly distributed between the saplings 4, whereby the grid size of these firebreaks of the first type need by no means necessarily coincide with the grid size of the fences 2. The grid size of the fences 2 is determined in accordance with experience, in order to prevent pests from the outside, in particular game or herds of domestic animals, from penetrating into the region 1 to be afforested. The grid size of the firebreaks 5 of the first type is, in contrast, assessed in accordance with other matters of experience, namely those which are aimed at preventing the spreading of a fire which arises in any of the parcels 3. Conventionally, there are also provided further supply arrangements 6, such as nurseries, administrative areas, irrigation plants and the like, whereby such can be provided also outside of the region 1 to be afforested, but can also be provided in each of the parcels or a group of parcels 3.

Within the region 1 to be afforested there are provided further firebreaks 7 of a second type, which differ from those of the first type on the one hand in that they are not adapted to a grid size or pattern, but rather to a character, such as an alphanumeric character, or symbolize a logo which is provided in the region 1 to be afforested. On the other hand, these firebreaks 7 of the second type contrast also in their dimensions from the firebreaks 5 of the first type, in their width. Thirdly, through a special handling of the firebreaks 5 and 7 of the first and second types it is provided that the first contrast as little as possible with the surroundings (terrain with saplings 4) whereas the latter contrast very clearly.

If the shoots or saplings are trees whose basic colour is dark and substantially green, at least when observed from a distance, the firebreaks 5 of the first type can be formed by means of untreated ground or ground with suitable likewise substantially dark growth, preferably also with green colouring, whereas the firebreaks 7 of the second type can be formed by means of ploughed, possibly also gravelled or sanded ground, which is then very light, and thus at least upon observation from a distance, for example from a mountain or a flying object, if applicable also a satellite, the character is given prominence standing out clearly from the surroundings.

As is schematically illustrated there are thereby provided additional connecting firebreaks 8, which are similar or the same as those of the firebreaks 5 of the first type, in order to establish connections serving for fire protection to the firebreaks of the first type or to the edge of the region 1 to be afforested. Further, through these, access is possible for tending to the firebreak 7 of the second type.

It has been found that the disposition of the fences 2 need not necessarily be altered, but it has also been found that the path of the fences 2 can be adapted entirely or in part to the path of the firebreaks 7 of the second type.

Since it can be assumed that many further regions (not shown in detail) of the same configuration and likewise to be afforested join to the one illustrated region 1 to be afforested, for which the firebreaks 7 of the second type can in each case form other characters, the state of growth of the individual regions 1 to be afforested can be determined from greater distance, for example by means of colour tests. Further it is possible to make known to the public a sponsor for a region 1 to be afforested in that a character chosen by him, which may be a self-chosen logo, wording or the like, is selected as that character which by means of the firebreaks 7 of the second type in introduced in a prominent manner into the region 1 to be afforested.

What is claimed is:

1. Method of large scale afforestation having the steps laying out firebreaks, planting shoots or saplings, tending to the shoots or saplings and the firebreaks, characterized in that, in the region (1) to be afforested, firebreaks (5) of a first type are laid out in a regular grid pattern and with a ground configuration of a colour which is adapted to the surroundings and in that in the region (1) to be afforested there are further laid out firebreaks (7) of a second type which extend in a manner deviating from the grid pattern and which are laid out with a ground configuration which contrasts in colour and with a different width, the firebreaks (5) of the first type surrounding those (7) of the second type, and connecting firebreaks (8) being laid out from the second type (7) to the first type (5), which connecting firebreaks have the ground configuration in terms of colour and the width of the first type (5).

2. Method according to claim 1, characterized by fencing (2) in parcels (3) at least in that section of the region (1) to be afforested which has the firebreaks (5) of the first type.

* * * * *